US010571949B2

(12) United States Patent
Isono

(10) Patent No.: US 10,571,949 B2
(45) Date of Patent: Feb. 25, 2020

(54) BRAKE OPERATING DEVICE

(71) Applicant: TOYOTA JIDOSHA KABUSHIKI KAISHA, Toyota-shi, Aichi (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/935,645

(22) Filed: Mar. 26, 2018

(65) Prior Publication Data

US 2018/0275712 A1 Sep. 27, 2018

(30) Foreign Application Priority Data

Mar. 24, 2017 (JP) .................. 2017-058542

(51) Int. Cl.
| | |
|---|---|
| B60T 7/06 | (2006.01) |
| B60T 11/18 | (2006.01) |
| G05G 5/03 | (2008.04) |
| F16F 3/04 | (2006.01) |
| F16F 9/516 | (2006.01) |
| F16F 13/00 | (2006.01) |
| G05G 1/44 | (2008.04) |

(52) U.S. Cl.
CPC .................. *G05G 5/03* (2013.01); *B60T 7/06* (2013.01); *B60T 11/18* (2013.01); *F16F 3/04* (2013.01); *F16F 9/5165* (2013.01); *F16F 13/007* (2013.01); *G05G 1/44* (2013.01)

(58) Field of Classification Search
CPC ... B60T 7/04; B60T 7/06; B60T 11/16; B60T 11/18; G05G 5/03; G05G 1/44
See application file for complete search history.

(56) References Cited

U.S. PATENT DOCUMENTS

| 5,567,021 A * | 10/1996 | Gaillard .................. B60T 7/042 188/358 |
| 5,951,121 A * | 9/1999 | Takahashi ............... B60T 7/042 303/115.1 |
| 7,954,908 B2 * | 6/2011 | Giering ................... B60T 7/042 303/20 |
| 2005/0235820 A1 * | 10/2005 | Fujiwara ................. B60T 7/042 91/369.2 |

(Continued)

FOREIGN PATENT DOCUMENTS

| DE | 10358321 A1 * | 6/2004 | ............ B60T 8/3255 |
| EP | 1142766 A1 * | 10/2001 | .............. B60T 7/042 |

(Continued)

OTHER PUBLICATIONS

DE 10358321 A1, EPO translation, Jun. 2004. (Year: 2004).*

*Primary Examiner* — Thomas J Williams
(74) *Attorney, Agent, or Firm* — Oliff PLC

(57) ABSTRACT

A brake operating device to improve a brake feeling by a simple structure without a hydraulic source or an electric power source. A first reaction force establishing mechanism as an elastic member establishes the reaction force against the pedal force applied to the brake pedal. A second reaction force establishing mechanism increases the reaction force when depressing the brake pedal. The first reaction force establishing mechanism and the second reaction force establishing mechanism are arranged coaxially in series.

8 Claims, 2 Drawing Sheets

(56) References Cited

U.S. PATENT DOCUMENTS

2005/0269871 A1* 12/2005 Saito .................. B60T 7/042
303/20
2010/0176652 A1* 7/2010 Arakawa ................ B60T 1/10
303/10
2018/0043865 A1* 2/2018 Pennala .................... B60T 7/06

FOREIGN PATENT DOCUMENTS

| JP | 2003261015 A * | 9/2003 | |
|----|----|----|----|
| JP | 2005-313663 A | 11/2005 | |
| JP | 2013-006522 A | 1/2013 | |
| JP | 2014-144655 A | 8/2014 | |
| WO | WO-2009003835 A2 * | 1/2009 | ............. B60T 7/042 |

\* cited by examiner

BRAKE OPERATING DEVICE

CROSS REFERENCE TO RELATED APPLICATIONS

The present disclosure claims the benefit of Japanese Patent Application No. 2017-058542 filed on Mar. 24, 2017 with the Japanese Patent Office, the disclosure of which are incorporated herein by reference in its entirety.

BACKGROUND

Field of the Disclosure

Embodiments of the present disclosure relate to the art of a drive system for vehicles comprising a plurality of brake units to apply a brake torque individually to each wheel.

Discussion of the Related Art

JP-A-2014-144655 describes a brake device configured so as to improve a brake feeling. The brake device taught by JP-A-2014-144655 comprises a stroke simulator for establishing a reaction force in accordance with an operating amount of the brake device, and a master cylinder. According to the teachings of JP-A-2014-144655, a first reaction force chamber and a second reaction force chamber are communicated to each other through the stroke simulator. The master cylinder has a regulator device adapted to regulate a pressure of fluid delivered from a hydraulic source in accordance with an operating amount of the brake device or a target braking force computed by an electronic control unit.

JP-A-2013-006522 describes a brake device which can suppress reaction force characteristics from being affected by the dependence on stroke velocity. According to the teachings of JP-A-2013-006522, functional fluid is encapsulated between a piston and a cylinder. A viscosity of the functional fluid is controlled in accordance with magnetic field or electric field thereby changing a shearing force acting between the piston and cylinder.

According to the teachings of JP-A-2014-144655, a brake feeling is improved by controlling the reaction force against a pedal force by the stroke simulator and the master cylinder. According to the teachings of JP-A-2013-006522, a brake feeling is also improved by controlling the reaction force.

Thus, in both of the brake devices described in JP-A-2014-144655 and JP-A-2013-006522, the reaction force against a pedal force is controlled by the stroke simulator and the master cylinder. However, such brake devices having the master cylinder are too large and too complicated to be incorporated into an electric brake device without requiring hydraulic pressure. Nonetheless, it is difficult to improve a brake feeling in the brake device without the master cylinder.

SUMMARY

Aspects of the present disclosure have been conceived noting the foregoing technical problems, and it is therefore an object of the present disclosure is to provide a brake operating device configured so as to improve a brake feeling by a simple structure without a hydraulic source or an electric power source.

An embodiment of the present disclosure relates to a brake operating device comprising a reaction force establishing mechanism that establishes a reaction force against a pedal force applied to a brake pedal. In order to achieve the above-explained objective, according to the embodiment of the present disclosure, a first reaction force establishing mechanism as an elastic member establishes a reaction force against the pedal force applied to the brake pedal, and a second reaction force establishing mechanism increases the reaction force when depressing the brake pedal and with an increasing in a depressing speed of the brake pedal. In addition, the first reaction force establishing mechanism and the second reaction force establishing mechanism are arranged coaxially in series.

In a non-limiting embodiment, the second reaction force establishing mechanism may comprise: a piston held in a cylinder while being allowed to reciprocate in an axial direction in response to a pivotal motion of the brake pedal; a reaction chamber formed in the cylinder that is divided into a first reaction chamber and a second reaction chamber by the piston; a fluid held in the reaction chamber; and a flow path connecting the first reaction chamber and the second reaction chamber. In addition, the second reaction force establishing mechanism may be adapted to increase a flow resistance of the fluid flowing through the flow path when depressing the brake pedal, in comparison with the flow resistance of the fluid flowing through the flow path when returning the brake pedal.

In a non-limiting embodiment, the flow path may include an orifice that increases the flow resistance of the fluid.

In a non-limiting embodiment, the orifice may include: a diametrically smaller first orifice that always connects the first reaction chamber and the second reaction chamber; and a diametrically larger second orifice that is opened when depressing the brake pedal.

In a non-limiting embodiment, the brake operating device may further comprise a check valve that selectively opens and closes the second orifice.

In a non-limiting embodiment, the orifice may include: a diametrically smaller first orifice that always connects the first reaction chamber and the second reaction chamber; and a diametrically larger second orifice that is opened when depressing the brake pedal. In addition, the brake operating device may further comprise a check valve that selectively opens and closes the second orifice.

In a non-limiting embodiment, the flow path may include a flow path penetrating through the piston.

In a non-limiting embodiment, the piston may be formed on a piston rod including a first portion and a second portion. In addition, the brake pedal may be connected to the first portion of the piston rod through a transmission member, and the second portion of the piston rod may be connected to the first reaction force establishing mechanism.

In a non-limiting embodiment, the first reaction force establishing mechanism may comprise a movable cylinder that reciprocates in the axial direction in response to a reciprocation of the piston rod, and a supporting member that guides a leading end of the movable cylinder. The elastic member may include a first spring interposed between the movable cylinder and the supporting member, and a second spring interposed between the first portion of the piston rod and the movable cylinder. In addition, an elastic force of the first spring may be greater than an elastic force of the second spring.

Thus, according to according to the embodiment, the first reaction force establishing mechanism establishes the reaction force against the pedal force applied to the brake pedal by the elastic member; and the second reaction force establishing mechanism establishes the reaction force by a flow resistance of the fluid flowing through the reaction chamber.

As described, the second reaction force establishing mechanism increases the reaction force when depressing the brake pedal and with an increasing in a depressing speed of the brake pedal. According to the embodiment, therefore, brake feeling when depressing the brake pedal can be improved.

Specifically, when depressing the brake pedal, the check valve is closed and hence the fluid is allowed to flow only through the diametrically smaller first orifice. That is, a flow resistance of the fluid is increased. In this case, therefore, the reaction force against the pedal force applied to the brake pedal is increased by the increased flow resistance of the fluid. By contrast, when returning the brake pedal, the check valve is opened so that the fluid is allowed to flow through the diametrically larger second orifice. In this case, therefore, the flow resistance of the fluid is reduced so that the brake pedal is allowed to return smoothly to an original position by spring forces of the elastic members.

The characteristics and magnitude of the reaction force against the pedal force applied to the brake pedal may be altered arbitrarily by changing constants of the first spring and the second spring and diameters of the first orifice and the second orifice.

In addition, since the first reaction force establishing mechanism and the second reaction force establishing mechanism are arranged coaxially in series, structure of the brake operation device can be simplified in comparison with that of the conventional brake operation device having a master cylinder and a stroke simulator.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 1:
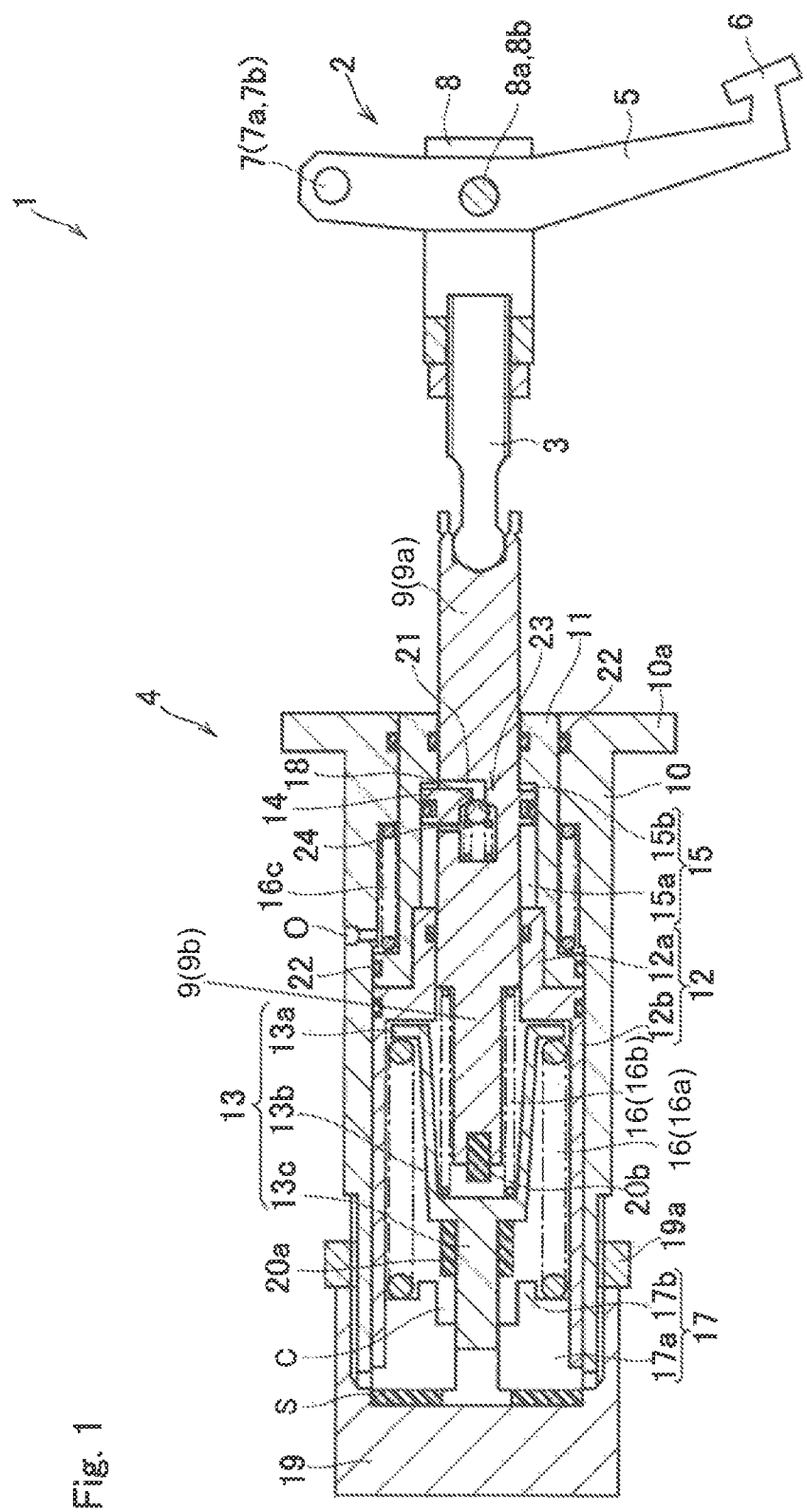
FIG. 1 is a cross-sectional showing one example of a structure of the brake operating device according to the embodiment of the present disclosure.

Embodiments of the present disclosure will now be explained with reference to the accompanying drawings. Turning now to FIG. 1, there is shown a brake operating device 1 according to the embodiment. The brake operating device 1 establishes a braking force applied to a vehicle in accordance with a stroke of a brake pedal 2 and a pedal force applied to the brake pedal 2, without requiring a hydraulic source and an electric power source.

The brake operating device 1 comprises a brake pedal 2, an operation rod 3 as a transmission member, and a stroke simulator 4. The brake operating device 1 is configured so as to establish a reaction force to provide a preferable brake feeling when depressing or returning the brake pedal 2.

The brake pedal 2 comprises a lever 5 and a pedal pad 6. The lever 5 hangs from a vehicle body (not shown) in a pivotal manner, and the pedal pad 6 is attached to a leading end of the lever 5.

The brake pedal 2 further comprises a pivot point 7 at which the lever 5 is connected to the vehicle body, and an output member 8 attached to an intermediate portion of the lever 5. The pivot point 7 includes a hole 7a formed on an upper end portion of the lever 5, and a pin 7b inserted into the hole 7a to attach the lever 5 to the vehicle body in a pivotal manner. Alternatively, the pin 7b may also be formed integrally with the lever 5 and inserted into a hole formed of the vehicle body.

The lever 5 is connected to the operation rod 3 through the output member 8 so that a depressing force applied to the pedal pad 6 is transmitted to the operation rod 3. Specifically, the output member 8 comprises a hole 8a penetrating through the output member 8 and the lever 5, and a pin 8b inserted into the hole 8a to attach the lever 5 to the output member 8. Here, the pin 8b is allowed to rotate in the hole 8a.

One end of the operation rod 3 is coupled to the lever 5 through the output member 8 and the other end of the operation rod 3 is coupled to a piston rod 9 protruding from an after-mentioned cylinder of the stroke simulator 4, so as to transmit the pedal force applied to the brake pedal 2 to the stroke simulator 4, and to transmit the reaction force established by the stroke simulator 4 against the pedal force to the brake pedal 2. The piston rod 9 includes a diametrically larger portion 9a as a first portion and a diametrically smaller portion 9b as a second portion. Specifically, the operation rod 3 is connected to the diametrically larger portion 9a of the piston rod 9 through a pivotal joint, and the operation rod 3 and the piston rod 9 are reciprocated by a pivotal motion of the lever 5 caused by the pedal force applied to the pedal pad 6.

The stroke simulator 4 serves as a reaction force establishing mechanism to establish a reaction force against a pedal force applied to the brake pedal 2. Specifically, the stroke simulator 4 comprises a housing 10, a plurality of cylindrical members 11, 12, and 13, a piston 14, a reaction chamber 15, an elastic member 16, a supporting member 17, and orifice 18.

The housing 10 is a cylindrical member, and a first cylindrical member 11, a second cylindrical member 12, and a third cylindrical member 13 are held in an internal space of the housing 10 in order from the brake pedal 2 side. A cylindrical space created between the first cylindrical member 11 and a diametrically smaller portion 12a of a second cylindrical member 12 serves as the reaction chamber 15, and the reaction chamber 15 is closed by an outer circumferential face of the diametrically larger portion 9a of the piston rod 9. The reaction chamber 15 thus formed is filled with fluid such as oil. The piston 14 as a flange member is formed around the diametrically larger portion 9a of the piston rod 9 at a substantially intermediate portion, and the piston 14 is held in the reaction chamber 15 while being allowed to reciprocate in an axial direction together with the piston rod 9. A flange portion 10a is formed on one end of the housing 10, and the other end of the housing 10 is fixed to a predetermined stationary member 19 of the vehicle body by a fixing member 19a such as a bolt.

The first cylindrical member 11 extends in the housing 10 from the flange portion 10a to an intermediate portion of the housing 10. One end of the first cylindrical member 11 is fitted onto the diametrically larger portion 9a of the piston rod 9, and the other end of the first cylindrical member 11 is contacted to an inner circumferential face of the housing 10.

The second cylindrical member 12 extends in the housing 10 from the intermediate portion of the housing 10 to near the stationary member 19. The second cylindrical member 12 comprises the aforementioned diametrically smaller portion 12a and a diametrically larger portion 12b. Specifically, the diametrically smaller portion 12a is fitted into the other end of the first cylindrical member 11, and the diametrically larger portion 12b is contacted to the inner circumferential face of the housing 10.

The third cylindrical member 13 is fitted into the diametrically larger portion 12b of the second cylindrical member 12 in such a manner as to be reciprocated in the axial direction by an elastic member 16 in accordance with a reciprocating motion of the piston rod 9. The third cylindrical member 13 comprises a bottomed-cylindrical portion 13b, a flange portion 13a formed on a leading end of the bottomed-cylindrical portion 13b, and a shaft portion 13c extending toward the stationary member 19. The elastic member 16 comprises: a main spring 16a arranged between the flange portion 13a of the third cylindrical member 13 and the supporting member 17; and a sub-spring 16b arranged between a step portion between the diametrically larger portion 9a and the diametrically smaller portion 9b of the piston rod 9 and a bottom face of the bottomed-cylindrical portion 13b. In addition, a buffer member (e.g., a rubber member) is fitted onto the shaft portion 13c of the third cylindrical member 13 so as to absorb a collision impact between the third cylindrical member 13 and the supporting member 17.

The reaction chamber 15 is divided into a first chamber 15a and a second chamber 15b by the piston 14 so that capacities of the first chamber 15a and the second chamber 15b are varied by a reciprocation of the piston 14. Since the fluid in encapsulated in the reaction chamber 15, a reaction force against the pedal force applied to the pedal pad 6 is hydraulically established. The diametrically smaller portion 9b of the piston rod 9 is inserted into the bottomed-cylindrical portion 13b of the third cylindrical member 13, and as described, the diametrically larger portion 9a of the piston rod 9 is connected to the bottom face of the bottomed-cylindrical portion 13b via the sub-spring 16b.

A flow path (i.e., a port) 21 penetrates through the piston rod 9 and the piston 14 so that the fluid, is supplied to the reaction chamber 15. When the brake pedal 2 is depressed, therefore, a reaction force against the pedal force applied to the pedal pad 6 is established by a flow resistance (or a fluid friction). An axial length of the reaction chamber 15 is set in such a manner that the piston 14 will not be brought into contact to a leading end of the diametrically smaller portion 12a of the second cylindrical member 12 even when the brake pedal 2 is depressed to a maximum extent. In this situation, the sub-spring 16b is compressed by the diametrically larger portion 9a of the piston rod 9 to a maximum extent, and the main spring 16a is compressed by the flange portion 13a of the third cylindrical member 13 to a maximum extent. However, since the fluid still remains in the first chamber 15a, the reaction force established by the flow resistance may be maintained. In order to prevent leakage from the reaction chamber 15, a sealing member such as an O-ring is individually arranged in the first cylindrical member 11, the second cylindrical member 12, and the piston 14.

A reaction force against the pedal force applied to the pedal pad 6 is also established by elastic forces of the main spring 16a and the sub-spring 16b. When the pedal force applied to the pedal pad 6 is eliminated, the brake pedal 2 is returned to an original position by the elastic forces of the main spring 16a and the sub-spring 16b. For example, a coil spring may be used individually as the main spring 16a and the sub-spring 16b, and the elastic force of the main spring 16a is greater than the elastic force of the sub-spring 16b. In the embodiment, accordingly, the main spring 16a serves as a "first spring", and the sub-spring 16b serves as a "second spring".

In the embodiment, the main spring 16a and the sub-spring 16b also serve as a "first reaction force establishing mechanism" to establish the reaction force against the pedal force applied to the pedal pad 6, and the piston 14 and the reaction chamber 15 serves as a "second reaction force establishing mechanism". The first reaction force establishing mechanism and the second reaction force establishing mechanism are arranged coaxially in series.

The supporting member 17 is disposed at a rear end of the stroke simulator 4 to receive a reaction force of the compressed main spring 16a. The supporting member 17 comprises an annular portion 17a that guides the shaft portion 13c of the third cylindrical member 13, and a cylindrical portion 17b protruding toward the main spring 16a that is diametrically larger than the annular portion 17a. A rubber 20a is fitted onto a base end of the shaft portion 13c of the third cylindrical member 13, and the rubber 20a is fitted into a clearance C created between the shaft portion 13c of the third cylindrical member 13 and the cylindrical portion 17b of the supporting member 17 when the third cylindrical member 13 is pushed by the sub-spring 16b toward the supporting member 17. Accordingly, the third cylindrical member 13 serves as a movable cylinder of the embodiment. A third spring 16c interposed between the housing 10 and the first cylindrical member 11 to reduce a clearance between the first cylindrical member 11 and the second cylindrical member 12, and to apply a load to a load sensor S is arranged between the supporting member 17 and the stationary member 19. In order to supply the fluid to the reaction chamber 15, an inlet O is formed in the housing 10 on a radially outer side of the third spring 16c.

Thus, the brake operating device 1 according to the embodiment is not provided with a hydraulic source master cylinder. In order to improve a brake feeling, according to the embodiment, the second reaction force establishing mechanism is adapted to differentiate the brake feeling when depressing the brake pedal 2 and when returning the brake pedal 2.

To this end, an oil chamber 24 is formed in the diametrically larger portion 9a of the piston rod 9 in such a manner as to be connected to the reaction chamber 15. Specifically, the oil chamber 24 is connected to the reaction chamber 15 through a check valve 23, an orifice 18, and the flow path 21. The oil chamber 24 is also connected to the reaction chamber 15 through a flow path 24a formed integrally with the oil chamber 24. Thus, in the second reaction force establishing mechanism, the check valve 23 and the orifice 18 are arranged integrally in the oil chamber 24.

Figure 2:
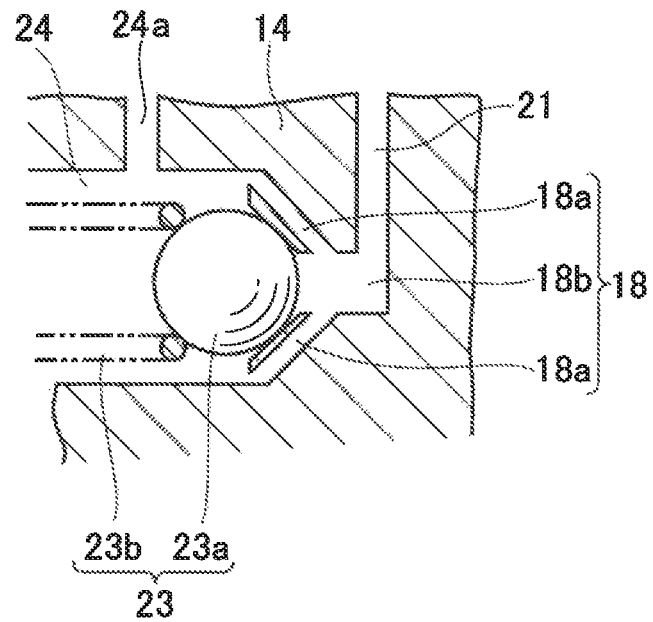
FIG. 2 is a cross-sectional view showing a cross-section of an orifice and a check valve of the brake operating device.

Specifically, the orifice 18 comprises a diametrically smaller first orifice 18a and a diametrically larger second orifice 18b. One end of the second orifice 18b is connected to the flow path 21, and the other end of the second orifice 18b is connected to the check valve 23. The check valve 23 is adapted to differentiate a flow rate of the fluid flowing between the reaction chamber 15 and the oil chamber 24 when depressing the brake pedal 2 and when returning the brake pedal 2. Structures of the orifice 18 and the check valve 23 are shown in FIG. 2 in more detail. As illustrated in FIG. 2, the check valve 23 comprises a valve ball 23a as a valve element, a valve seat (not shown) to which the valve ball 23a is contacted, and a spring 23b pushing the valve ball 23a toward the valve seat. At least one first orifice 18a is formed on a contact face of the valve seat so that the reaction chamber 15 and the oil chamber 24 are always connected to each other though the first orifice 18a.

Here will be explained an action of the second reaction force establishing mechanism. When the brake pedal 2 is depressed, the piston 14 is moved forward together with the piston rod 9 so that the capacity of the second chamber 15b of the reaction chamber is increased and the capacity of the first chamber 15a is decreased. Consequently, the fluid in the first chamber 15a is pushed by the piston 14 to be forced into the oil chamber 24 through the flow path 24a. In this situation, the valve ball 23a is pushed onto the valve seat by the spring 23b and the fluid in the oil chamber 24, that is, the check valve 23 is closed. In this situation, however, the fluid in the oil chamber 24 is still forced into the first chamber 15a through the diametrically smaller first orifice 18a. By contrast, when the brake pedal 2 is returned, the piston 14 is withdrawn backwardly together with the piston rod 9 so that the capacity of the second chamber 15b of the reaction chamber is decreased and the capacity of the first chamber 15a is increased. Consequently the fluid in the second chamber 15b is pushed by the piston 14 to be forced into the oil chamber 24 through the flow path 21. In this situation, the valve ball 23a is pushed by the fluid supplied from the second chamber 15b through the flow path 21 and the diametrically larger second orifice 18b to be isolated away from the valve seat that is, the check valve 23 is opened. Meanwhile, the fluid is also supplied from the second chamber 15b to the oil chamber 24 through the diametrically smaller first orifice 18a. That is, a cross sectional area of the flow path is switched between larger area and smaller area when depressing the brake pedal 2 and when returning the brake pedal 2. For these reasons, the reaction force established by the second reaction force establishing mechanism is increased when depressing the brake pedal 2, but reduced when returning the brake pedal 2.

Next, here will be explained an action of the brake operating device 1 according to the embodiment. When the brake pedal 2 is depressed, the reaction force against the pedal force applied to the pedal pad 6 is established by the stroke simulator 4. Specifically, when the brake pedal 2 is depressed, the operation rod 3, the piston rod 9, and the piston 14 are moved forward in the axial direction so that the capacity of the second chamber 15b of the reaction chamber is increased and the capacity of the first chamber 15a is decreased. As described, the check valve 23 is closed in this case and hence the fluid in the oil chamber 24 is supplied to the second chamber 15b only through the diametrically smaller first orifice 18a. Consequently, the reaction force against the pedal force established by the second reaction force establishing mechanism is increased. In addition, the reaction force is also increased with an increasing in a depressing speed of the brake pedal 2.

In this situation, the sub-spring 16b is compressed by the diametrically larger portion 9a of the piston rod 9 to establish an additional reaction force against the pedal force applied to the pedal pad 6. In addition, a rubber 20b attached to a leading end of the diametrically smaller portion 9b of the piston rod 9 is brought into contact to the bottom of the bottomed-cylindrical portion 13b of the third cylindrical member 13 to establish an additional reaction force against the pedal force applied to the pedal pad 6.

Consequently, the third cylindrical member 13 is pushed forward by the sub-spring 16b so that the main spring 16a is compressed by the flange portion 13a of the third cylindrical member 13 to establish an additional reaction force against the pedal force applied to the pedal pad 6. In this situation, as described, the piston 14 will not be brought into contact to the leading end of the diametrically smaller portion 12a of the second cylindrical member 12 even when the brake pedal 2 is depressed to the maximum extent. That is, the second reaction force establishing mechanism is allowed to establish the reaction force against the pedal force. In addition, friction acting between the sealing member 22 and the piston rod 9 also acts as the reaction force in some measure.

By contrast, when the pedal force applied to the pedal pad 6 is eliminated, the brake pedal 2 is elastically returned to the original position by the main spring 16a and the sub-spring 16b. Specifically, a restoring force (i.e., an assist force) of the main spring 16a is applied to the brake pedal 2, and then restoring forces of the rubber 20b and the sub-spring 16b are applied to the brake pedal 2. In this situation, the piston 14 is withdrawn backwardly together with the piston rod 9 so that the capacity of the second chamber 15b of the reaction chamber is decreased and the capacity of the first chamber 15a is increased. Consequently, the fluid in the second chamber 15b is forced to the diametrically larger second orifice 18b through the flow path 21 so that the check valve 23 is opened. As a result, the fluid flows into the oil chamber 24 through the check valve 23. In this situation, the friction also acts between the sealing member 22 and the piston rod 9 in some measure.

Figure 3:
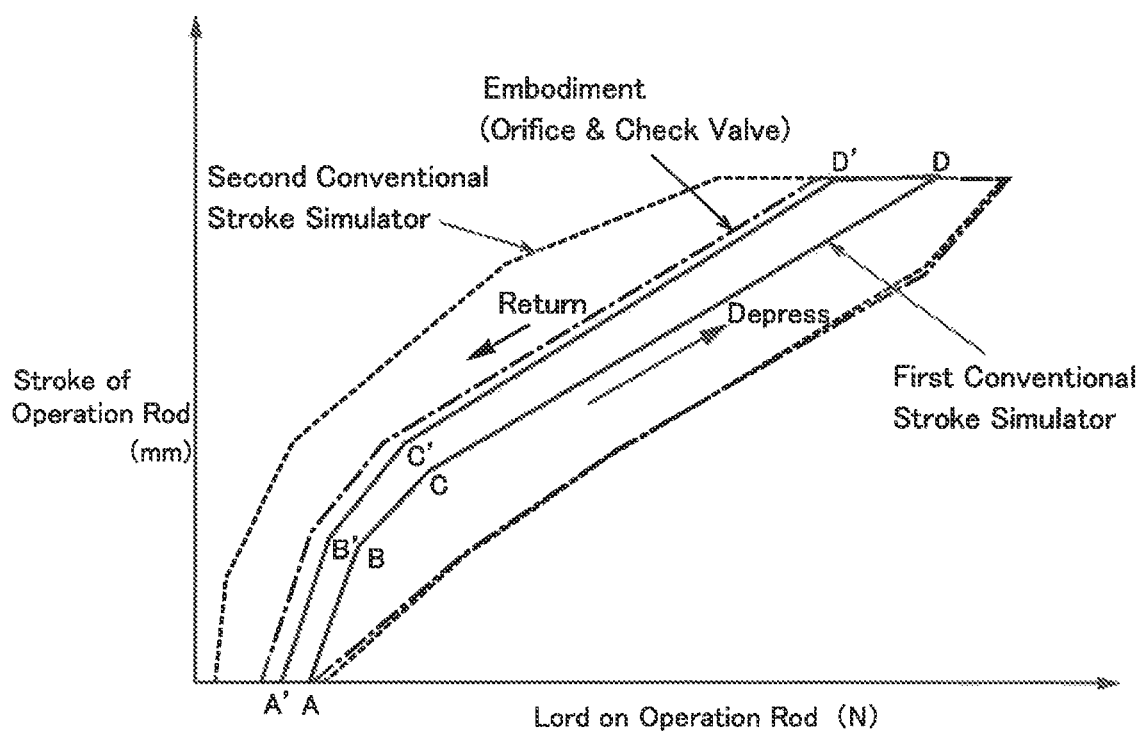
FIG. 3 is a graph showing a stroke of an operation rod and a load of the operation rod of the brake operating device.

Turning to FIG. 3, there is shown a relation between a stroke of the operation rod 3 and a load applied to the operation rod 3. In FIG. 3, the vertical axis represents the stroke of the operation rod 3, and the horizontal axis represents the load applied to the operation rod 3, the solid curve represents a first conventional stroke simulator without having an orifice, the dashed curve represents a second conventional stroke simulator having only an orifice, and the dashed-dotted curve represents the stroke simulator 4 according to the embodiment.

As indicated by the solid curves, according to the first conventional stroke simulator without having an orifice, the relations between the stroke of the operation rod and the load applied to the operation rod are substantially identical to each other in both cases of depressing the brake pedal 2 and returning the brake pedal 2. However, according to the first conventional stroke simulator, the reaction force when depressing the brake pedal and the reaction force when returning the brake pedal are slightly different from each other due to hysteresis such as friction of the sealing member 22. In each solid curve, an inclination between point A and point B indicates a reaction force established by the sub-spring 16b and the flow resistance, an inclination between point B and point C indicates the reaction force to which the elastic force of the rubber 20b is added, and an inclination between point C and point D indicates the reaction force to which the spring force of the main spring 16a is added.

According to the second conventional stroke simulator, an inclination of the dashed curve representing the reaction force when depressing the brake pedal 2 is milder than the inclination of the solid curve representing the reaction force when depressing the brake pedal 2 in the first conventional stroke simulator. That is, the load on the operation rod 3 with respect to the stroke of the operation rod 3 is smaller, in other words, the reaction force against the pedal force is greater. By contrast, when returning the brake pedal 2, the stroke of the operation rod 3 with respect to the load on the operation rod 3 is greater than that of the first conventional stroke simulator indicated by the solid curve. That is, the brake pedal 2 returns slowly. This means that the orifice functions effectively to differentiate the brake feeling when depressing the brake pedal 2 and when returning the brake pedal 2.

In turn, according to the embodiment, the check valve 23 is closed when depressing the brake pedal 2. In the stroke simulator 4, therefore, the fluid is allowed to flow only through the diametrically smaller first orifice 18a when depressing the brake pedal 2. For this reason, when depressing the brake pedal 2, the reaction force of substantially same magnitude as the reaction force generated by the second conventional stroke simulator can be generated, as indicated by the dashed-dotted curve. By contrast, when returning the brake pedal 2, the check valve 23 is opened so that the fluid is allowed to flow through diametrically larger second orifice 18b. In this case, therefore, the brake pedal 2 is returned smoothly only by the spring forces of the main spring 16a and the sub-spring 16b as the case of the first conventional stroke simulator.

Thus, according to the embodiment, the brake feeling can be differentiated when depressing the brake pedal 2 and when returning the brake pedal 2. Specifically, when depressing the brake pedal 2, the reaction force against the pedal force applied to the pedal pad 6 is increased so that the brake feeling can be improved. By contrast, when returning the brake pedal 2, the flowing resistance of the fluid is reduced so that the brake pedal 2 is allowed to return smoothly by the spring forces of the main spring 16a and the sub-spring 16b.

The characteristics and magnitude of the reaction force against the pedal force applied to the pedal pad 6 may be altered arbitrarily by changing constants of the main spring 16a and the sub-spring 16b and diameters of the first orifice 18a and the second orifice 18b.

In addition, the operation rod 3 and the stroke simulator 4 are arranged coaxially. According to the embodiment, therefore, the structure of the brake operation device can be simplified in comparison with that of the conventional brake operation device having a master cylinder and a stroke simulator.

Although the above exemplary embodiments of the present disclosure have been described, it will be understood by those skilled in the art that the present disclosure should not be limited to the described exemplary embodiments, and various changes and modifications can be made within the scope of the present disclosure. For example, the orifice 18 and the check valve 23 may also be arranged separately. In addition, the orifice 18 may also be formed in the piston 14.

What is claimed is:

1. A brake operating device, comprising:
    a reaction force establishing mechanism that establishes a reaction force against a pedal force applied to a brake pedal,
    wherein the reaction force establishing mechanism includes a first reaction force establishing mechanism, and a second reaction force establishing mechanism,
    the first reaction force establishing mechanism includes an elastic member that establishes the reaction force against the pedal force applied to the brake pedal,
    the second reaction force establishing mechanism is adapted to increase the reaction force when depressing the brake pedal and with an increasing in a depressing speed of the brake pedal, in comparison with the reaction force established when returning the brake,
    the first reaction force establishing mechanism and the second reaction force establishing mechanism are arranged coaxially in series,
    wherein the second reaction force establishing mechanism comprises:
       a piston held in a cylinder while being allowed to reciprocate in an axial direction in response to a pivotal motion of the brake pedal;
       a reaction chamber formed in the cylinder that is divided into a first reaction chamber and a second reaction chamber by the piston;
       a fluid held in the reaction chamber; and
       a flow path connecting the first reaction chamber and the second reaction chamber, and
    wherein the second reaction force establishing mechanism is adapted to increase a flow resistance of the fluid flowing through the flow path when depressing the brake pedal, in comparison with the flow resistance of the fluid flowing through the flow path when returning the brake pedal.

2. The brake operating device as claimed in claim 1, wherein the flow path includes an orifice that increases the flow resistance of the fluid.

3. The brake operating device as claimed in claim 2, wherein the orifice includes:
    a diametrically smaller first orifice that always connects the first reaction chamber and the second reaction chamber; and
    a diametrically larger second orifice that is opened when depressing the brake pedal.

4. The brake operating device as claimed in claim 3, further comprising:
    a check valve that selectively opens and closes the second orifice.

5. The brake operating device as claimed in claim 2, wherein the orifice includes:
    a diametrically smaller first orifice that always connects the first reaction chamber and the second reaction chamber; and
    a diametrically larger second orifice that is opened when depressing the brake pedal, and further comprising:
    a check valve that selectively opens and closes the second orifice.

6. The brake operating device as claimed in claim 1, wherein the flow path includes a flow path penetrating through the piston.

7. The brake operating device as claimed in claim 1, wherein the piston is formed on a piston rod including a first portion and a second portion,
    the brake pedal is connected to the first portion of the piston rod through a transmission member, and
    the second portion of the piston rod is connected to the first reaction force establishing mechanism.

8. The brake operating device as claimed in claim 7, wherein the first reaction force establishing mechanism comprises a movable cylinder that reciprocates in the axial direction in response to a reciprocation of the piston rod, and a supporting member that guides a leading end of the movable cylinder,
    the elastic member includes a first spring interposed between the movable cylinder and the supporting member, and a second spring interposed between the first portion of the piston rod and the movable cylinder, and
    an elastic force of the first spring is greater than an elastic force of the second spring.

* * * * *